US008432578B2

(12) United States Patent
Nakayama et al.

(10) Patent No.: US 8,432,578 B2
(45) Date of Patent: Apr. 30, 2013

(54) SERIAL PRINTER FOR REDUCING PRINTER HEAD MOVEMENT

(75) Inventors: Masaki Nakayama, Tomi (JP); Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 464 days.

(21) Appl. No.: 12/729,140

(22) Filed: Mar. 22, 2010

(65) Prior Publication Data

US 2010/0238460 A1 Sep. 23, 2010

(30) Foreign Application Priority Data

Mar. 23, 2009 (JP) ................................ 2009-069625

(51) Int. Cl.
*G06K 15/10* (2006.01)

(52) U.S. Cl.
USPC .......................... 358/1.8; 358/1.12; 358/3.23

(58) Field of Classification Search ........... 358/1.1–3.29
See application file for complete search history.

(56) References Cited

U.S. PATENT DOCUMENTS

2009/0128842 A1* 5/2009 Nakayama et al. .......... 358/1.13

FOREIGN PATENT DOCUMENTS

| | | | |
|---|---|---|---|
| JP | 09-252386 | A | 9/1997 |
| JP | 2008-188936 | A | 8/2008 |
| JP | 2009-132155 | A | 6/2009 |
| JP | 2009-200558 | A | 9/2009 |

* cited by examiner

*Primary Examiner* — Benny Q Tieu
*Assistant Examiner* — Marcellus Augustin
(74) *Attorney, Agent, or Firm* — Kilpatrick Townsend & Stockton LLP

(57) ABSTRACT

Provided is a serial printer including: a reading unit configured to read a raster image from a manuscript medium; an analysis unit configured to derive a horizontal distribution of pixels darker than a background color of the manuscript medium in each band including a predetermined number of lines with respect to the raster image; a threshold derivation unit configured to derive a fixed threshold according to a length L of a section in which a cumulative frequency of the horizontal distribution of an edge of the band does not exceed a predetermined temporary threshold; and a movement distance control unit configured to reduce the movement distance of a printing head according to a section in which the cumulative frequency of the horizontal distribution from the edge of the band exceeds the fixed threshold.

8 Claims, 12 Drawing Sheets

SERIAL PRINTER FOR REDUCING PRINTER HEAD MOVEMENT

BACKGROUND

1. Technical Field

This application claims the benefit of Japanese Application No. 2009-069625, filed Mar. 23, 2009, all of which are hereby incorporated by reference.

The present invention relates to a serial printer and, more particularly, to control of a movement section of a printing head in logical seeking.

2. Related Art

In the related art, logical seeking is known as a technique of controlling a serial printer. Logical seeking refers to a technique of controlling the movement of a printing head and a printing medium according to a printing object so as to minimize a movement distance of the printing head. In addition, as an image processing technique of a scanner or a facsimile machine, a noise eliminating technique of eliminating noise corresponding to contamination, dust, or the like adhered to a manuscript sheet or a platen glass by image processing is known (for example, see JP-A-9-252386).

However, in the noise eliminating technique of the related art, noise which is not an isolated point may not be eliminated. If noise remains outside the range in which characters or photos are recorded on a manuscript medium, the printing head is pointlessly moved by logical seeking. That is, even when the noise eliminating technique of the related art and logical seeking are combined, an effect by which the time required for copying is shortened was limited.

As the invention for solving such a problem, it is conceivable to provide a technique that a horizontal band of pixels darker than the background color of a manuscript medium is derived in each band and the movement distance of the printing head is reduced according to a section in which a cumulative frequency from an edge of a band exceeds a predetermined threshold. Therefore, according to the invention associated with Japanese Patent Application No. 2008-36980, it is possible to reduce unnecessary movement of a printing head.

SUMMARY

An advantage of some aspects of the invention is that unnecessary movement of a printing head of a serial printer is further reduced according to the kind of a manuscript and the time required for copy is further shortened.

(1) The area of the margin of the manuscript medium is associated with the kind of a manuscript. For example, the area of the margin of the manuscript medium on which photos are mainly recorded is statistically less than the area of the margin of the manuscript medium on which characters are mainly recorded.

According to an aspect of the invention, there is provided a serial printer including: a reading unit configured to read a raster image from a manuscript medium; an analysis unit configured to derive a horizontal distribution of pixels darker than a background color of the manuscript medium in each band including a predetermined number of lines with respect to the raster image; a threshold derivation unit configured to derive a fixed threshold according to a length L of a section in which a cumulative frequency of the horizontal distribution from an edge of the band does not exceed a predetermined temporary threshold; and a movement distance control unit configured to reduce a movement distance of a printing head according to a section in which the cumulative frequency of the horizontal distribution from the edge of the band exceeds the fixed threshold.

The length L of the section in which the cumulative frequency from the edge of the band does not exceeds the predetermined temporary threshold is the length of the margin section. According to the invention, it is possible to reduce the unnecessary movement of the printing head according to the kind of the manuscript, as compared with the case of fixing the threshold compared with the cumulative threshold from the edge of the band of the horizontal distribution of the pixels darker than the background color of the manuscript medium in order to derive the fixed threshold according to the length of the margin section and, as a result, to further shorten a time required for copy.

(2) According to the invention, as the margin of the manuscript medium is wide, the reduction effect of the unnecessary movement of the printing head due to influence of remaining noise is improved. However, according to the invention, if the fixed threshold is excessive, an object which is not originally processed as noise may not be displayed in the printing result. For example, an end of a photo may be defective.

In the serial printer, the threshold derivation unit may derive the fixed threshold such that the wider the margin of the manuscript medium is, the higher the fixed threshold is.

Accordingly, it is possible to eliminate much more noise so as to efficiently reduce the unnecessary movement of the printing head due to remaining noise and to suppress a problem in which an object, which is not originally processed as noise, is not displayed in the printing result.

(3) In the serial printer, the threshold derivation unit may derive the fixed threshold according to extension T of a plurality of lengths L.

Accordingly, the fixed threshold is increased as the margin of the manuscript medium is increased.

(4) In the serial printer, the threshold derivation unit may derive the fixed threshold value according to the number N of a temporary margin section longer than a predetermined threshold $L_o$.

Accordingly, the fixed threshold is increased as the margin of the manuscript medium is increased.

(5) In the serial printer, the threshold derivation unit may derive the fixed threshold based on the horizontal distributions of all the bands corresponding to one page of the manuscript medium.

Accordingly, it is possible to derive a suitable fixed threshold by the object recorded on the manuscript medium, as compared with the case of deriving the fixed threshold based on some of the bands corresponding to one page.

(6) In the serial printer, the threshold derivation unit may derive the fixed threshold based on the horizontal distribution of the band corresponding to the front range in one page of the manuscript medium.

Accordingly, since the fixed threshold can be derived in a short period of time, as compared with the case of deriving the fixed threshold based on all the bands included in one page of the manuscript medium, it is possible to further shorten the time required for copying. In addition, the front range in one page of the manuscript medium is a range which is relatively first read in one page.

(7) In the serial printer, the movement distance control unit may reduce the movement distance of the printing head according to the section in which the cumulative frequency of the horizontal distribution from the edge of the band exceeds the temporary threshold in the front side of the printing range corresponding to the band as a basis of deriving the fixed threshold, and reduce the movement distance of the printing head according to the section in which the cumulative frequency of the horizontal distribution from the edge of the band exceeds the fixed threshold in the rear side of the printing range which does not correspond to the band as a basis of deriving the fixed threshold.

Accordingly, since printing can be executed without waiting for the derivation of the fixed threshold, it is possible to further suppress the time required for copying. In addition, the front side of the printing range is a printing range in which printing is relatively first executed and the rear side of the printing range is a printing range in which printing is relatively later executed.

(8) In the serial printer, the movement distance control unit may reduce the movement distance of the printing head over the entire printing range according to the section in which the cumulative frequency of the horizontal distribution from the edge of the band exceeds the fixed threshold.

Accordingly, it is possible to control the movement section using a suitable fixed threshold by an object recorded on the manuscript medium, as compared with the case where printing is executed without waiting for the derivation of the fixed threshold.

In addition, the invention may be implemented in a control program of a serial printer, a recording medium thereof, a control method of a serial printer and a control device of a serial printer. The recording medium may be a magnetic recording medium, a magneto-optical recording medium, or any recording medium which will be developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
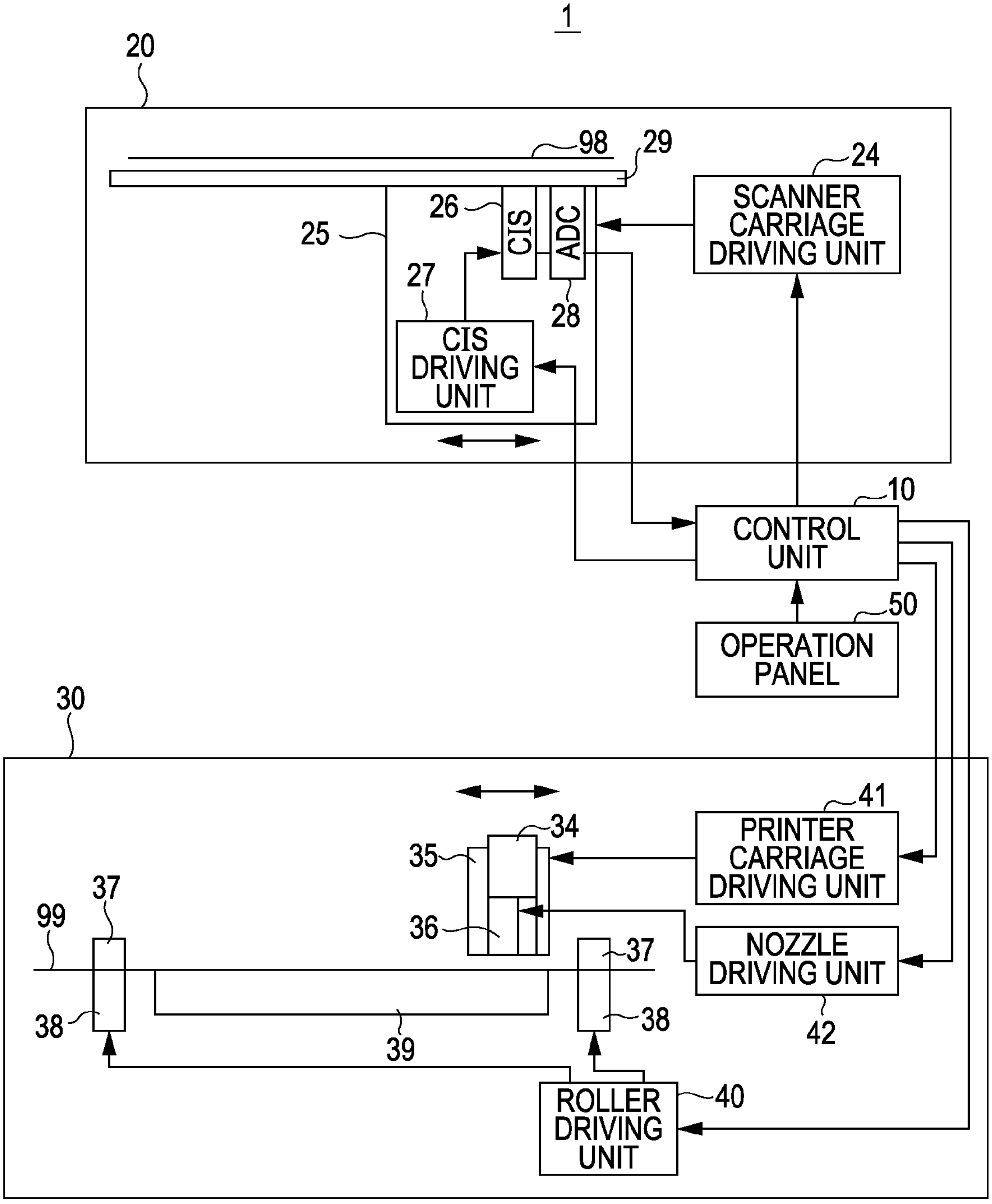
FIG. 1 is a block diagram according to an embodiment of the invention.

Hereinafter, the embodiments of the invention will be described with reference to the accompanying drawings. The corresponding components of each drawing are denoted by the same reference numerals and overlapping description will be omitted.

1. Configuration

Figure 2:
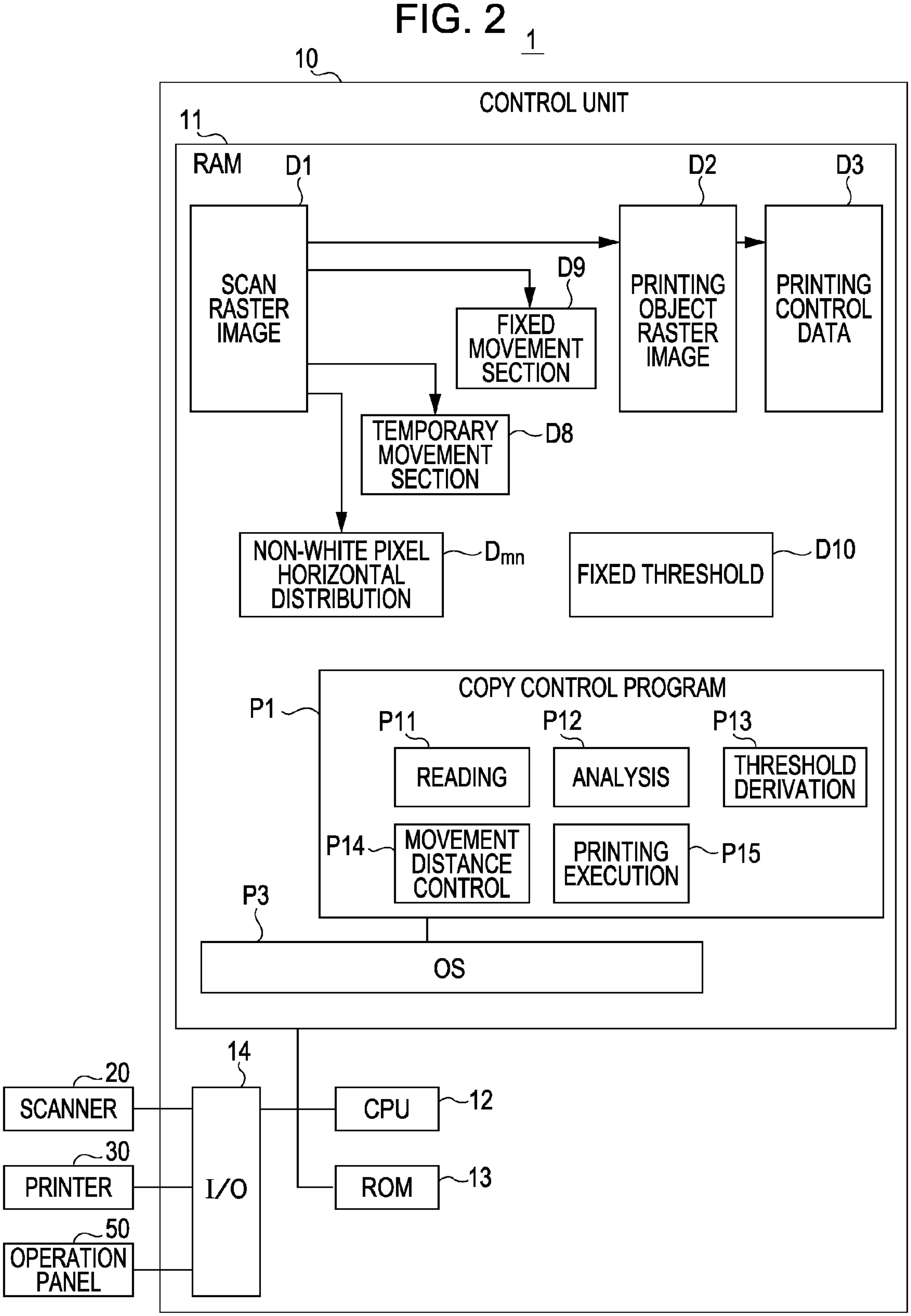
FIG. 2 is a block diagram according to the embodiment of the invention.

FIGS. 1 and 2 show a digital multifunction machine as an embodiment of a serial printer according to the invention. The digital multifunction machine 1 includes a scanner 20, a printer 30, a control unit 10 for controlling the scanner and the printer, and an operation panel 50 for operating the scanner and the printer.

The scanner 20 is a flat bed type image scanner for reading a raster image from a manuscript medium 98. The scanner 20 includes a platen glass 29 for positioning the manuscript medium 98, a contact type image sensor (CIS) 26, a CIS driving unit 27, and an Analog-to-Digital Converter (ADC) 28. The CIS 26, the CIS driving unit 27 and the ADC 28 are mounted in a scanner carriage 25. The scanner carriage 25 is supported to be reciprocatively movable in a direction (a horizontal direction of FIG. 2) parallel to the platen glass 29. The scanner carriage 25 is driven by a scanner carriage driving unit 24. The scanner carriage driving unit 24 includes a stepping motor, a driving force transmitting mechanism (a gear, a belt and the like) and a driving circuit. The CIS 26 includes a plurality of photoelectric conversion devices arranged in a direction (a direction perpendicular to the plane of paper of FIG. 2) perpendicular to a movement direction of the scanner carriage 25, a Complementary Metal Oxide Semiconductor (CMOS) reading circuit, a rod lens array and an illumination light source. The CIS 26 is driven by the CIS driving unit 27. The CIS driving unit 27 is an electronic circuit for converting a control signal output from the control unit 10 in a driving signal for driving the CIS 26. The output of the CIS 26 represents the amount of charges accumulated in the photoelectric conversion devices, that is, the luminance of each pixel. The output of the CIS 26 is converted into a digital signal by the ADC 28.

The printer 30 is a serial ink jet printer for forming an image by ejecting an ink supplied from a cartridge 34 to a printing medium 99. A plurality of cartridges 34, in which inks of different colors are filled, and a nozzle group 36 are mounted in a printer carriage 35. The printer carriage 35 is supported to be reciprocatively moveable in a direction (a horizontal direction of FIG. 2) perpendicular to a transportation direction (a direction perpendicular to the plane of paper of FIG. 2) of the printing medium 99. The printer carriage 35 is driven by a printer carriage driving unit 41. The printer carriage driving unit 41 includes a stepping motor, a driving force transmitting mechanism (a gear, a belt and the like) and a driving circuit. A platen 39 is provided immediately under a reciprocating range of the printer carriage 35. A gap according to the thickness of the printing medium 99 is set between the printer carriage 35 and the platen 39. The nozzle group 36 configuring a printing head includes a plurality of nozzles for ejecting the ink by a piezoelectric method. The plurality of nozzles for ejecting one kind of ink is arranged in the transportation direction (a direction perpendicular to the plane of paper of FIG. 2) of the printing medium 99. The plurality of nozzles for ejecting different kinds of inks is arranged in the movement direction (a horizontal direction of FIG. 2) of the printer carriage 35. Accordingly, the printer carriage 35 moves from edge to edge of a reciprocating section such that an image having a predetermined height can be formed on the printing medium 99. The height of the image formed on the printing medium 99 is set to the length of the image in the transportation direction of the printing medium 99. The printing medium 99 is transported in the gap between the printer carriage 35 and the platen 39 by a driving roller 38 and a driven roller 37. The driving roller 38 is driven by a roller driving unit 40. The roller driving unit 40 includes a stepping motor, a driving force transmitting mechanism (a gear, a belt and the like) and a driving circuit.

The control unit 10 includes a RMA 11, a CPU 12, a ROM 13 and an input/output mechanism 14. The scanner 20, the printer 30 and the operation panel 50 are connected to the input/output mechanism 14. Various computer programs, such as a copy control program P1, an Operation System (OS) P3 or the like, which are loaded into the RAM 11 and are executed by the CPU 12, are stored in the ROM 13.

The copy control program P1 is a computer program for reading a scan raster image D1 from the manuscript medium 98, editing a printing object raster image D2 from the scan raster image D1, converting the printing object raster image D2 into printing control data D3, and controlling the printer 30 based on the printing control data D3. The copy control program P1 is configured by a plurality of modules such as a reading module P11, an analysis module P12, a threshold derivation module P13, a movement distance control module P14, and a printing execution module P15.

Figure 3:
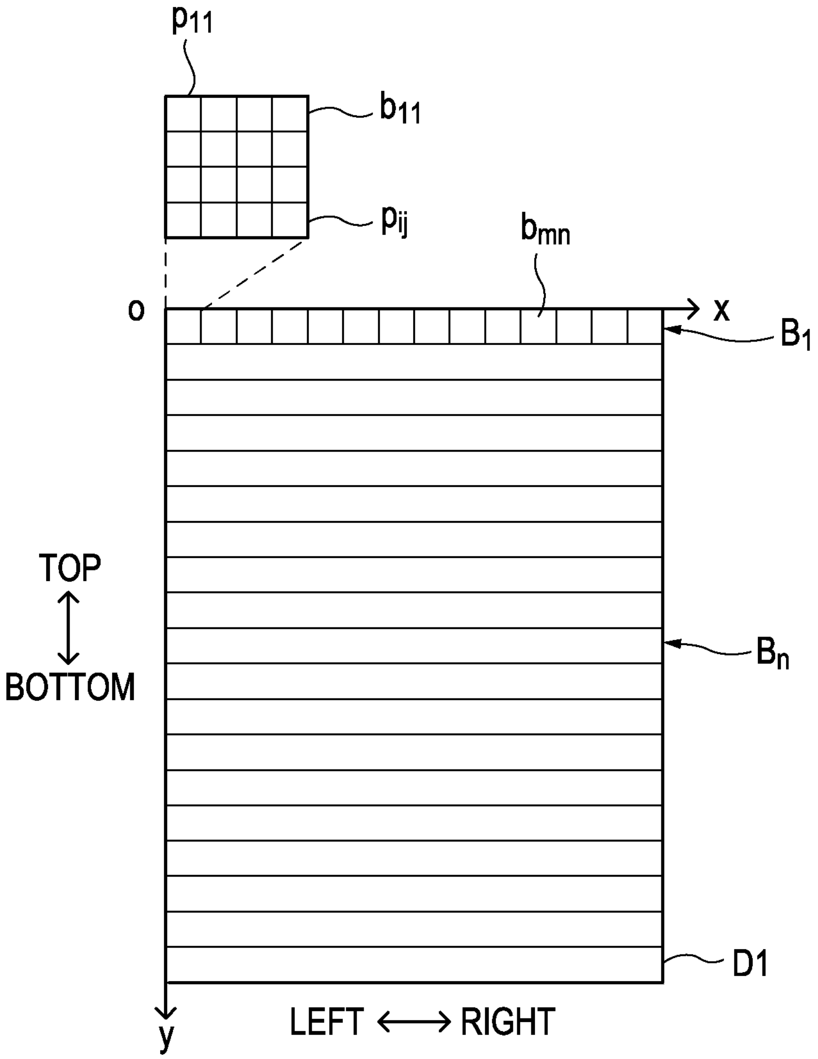
FIG. 3 is a schematic diagram illustrating a processing unit according the embodiment of the invention.

The reading module P11 performs a function for outputting a control signal for reading the scan raster image D1 from the manuscript medium 98 to the scanner carriage driving unit 24 and the CIS driving unit 27. FIG. 3 is a schematic view showing a processing unit of the scan raster image D1. The scan raster image D1 is composed of a plurality of pixels p. In a pixel $p_{ij}$, the luminance of the pixel located at (x, y)=(i, j) is held at, for example, 8 bits. An x coordinate indicates a position of a horizontal direction on the scan raster image D1 and y coordinate indicates a position of a vertical direction on the scan raster image D1. Here, an x-axis positive direction is a right direction and a y-axis positive direction is a lower direction. A processing unit composed of a pixel group corresponding to one row arranged in the horizontal direction is called a line, a processing unit composed of a line group of consecutive a rows is called a band, and a processing unit composed of a pixel group in which b pixels are arranged and c pixels are arranged in a square manner is a block (a, b and c are predetermined integers or 2 or more). In the present embodiment, the number a of lines configuring one band and the vertical direction length c of one block are equal.

The analysis module P12 performs a function for deriving a horizontal distribution of pixels darker than (having luminance lower than) a background color of the manuscript medium 98 in each band. Here, a data structure indicating the horizontal distribution is defined as a non-white pixel horizontal distribution $D_{mn}$. The non-white pixel horizontal distribution $D_{mn}$ maintains the number of pixels darker than the background color of the manuscript medium 98 included in an n-th band Bn from the top and an m-th block $b_{mn}$ from the left. Accordingly, when n is fixed to a certain non-negative number k, the non-white pixel horizontal distribution $b_{mk}$ represents the horizontal distribution of pixels darker than the background color of the manuscript medium 98 with respect to a band $B_k$ by setting the horizontal-direction length b of the block to a grade width and setting the number of pixels darker than the background color of the manuscript medium 98 belonging to each grade to a frequency.

The threshold derivation module P13 performs a function for deriving a section in which a cumulative frequency of the non-white pixel horizontal distribution $D_{mn}$ from an edge of the band is equal to or greater than a predetermined temporary threshold and deriving a fixed threshold D10 according to the length of a section in which the cumulative frequency of the non-white pixel horizontal distribution $D_{mn}$ from the edge of the band is less than the predetermined temporary threshold. Here, a section in which the cumulative frequency from the left end of the band is equal to or greater than the temporary threshold and the cumulative frequency from the right end of the band is equal to or greater than the temporary threshold is called a temporary non-margin section, an x coordinate of the left end of the temporary non-margin section is called a temporary starting point criterion, and an x coordinate of the right end of the temporary non-margin section is called a temporary end point criterion.

The movement distance control module P14 performs a function for deriving a section in which the cumulative frequency from the edge of the band exceeds the fixed threshold D10, editing the printing object raster image D2 from the scan raster image D1 according to the section in which the cumulative frequency from the edge of the band exceeds the fixed threshold D10, and reducing the movement distance of the printer carriage 35. Here, a section in which the cumulative frequency from the left end of the band is equal to or greater than the fixed threshold D10 and the cumulative frequency from the right end of the band is equal to or greater than the fixed threshold is called a fixed non-margin section, an x coordinate of the left end of the fixed non-margin section is called a fixed starting point criterion, and an x coordinate of the right end of the fixed non-margin section is called a fixed end point criterion.

The printing execution module P15 performs a function for converting the printing object raster image D2 into the printing control data D3 in each band using a color conversion table and controlling the printer carriage driving unit 41, the roller driving unit 40 and the nozzle driving unit 42 based on the printing control data D3. The printing control data D3 are information for controlling the amount of ink ejected in each nozzle and each line.

The control unit 10 functions as a copy control device or a printer control device including the reading unit, the analysis unit, the threshold derivation unit, the movement distance control unit and the printing execution unit by executing the program modules configuring the copy control program P1 by the CPU 12.

The operation panel 50 includes various operation buttons for operating the digital multifunction machine 1 and a Flat Panel Display (FPD) for displaying the status and GUI of the digital multifunction machine 1.

2. Copy Control Method

Figure 4:
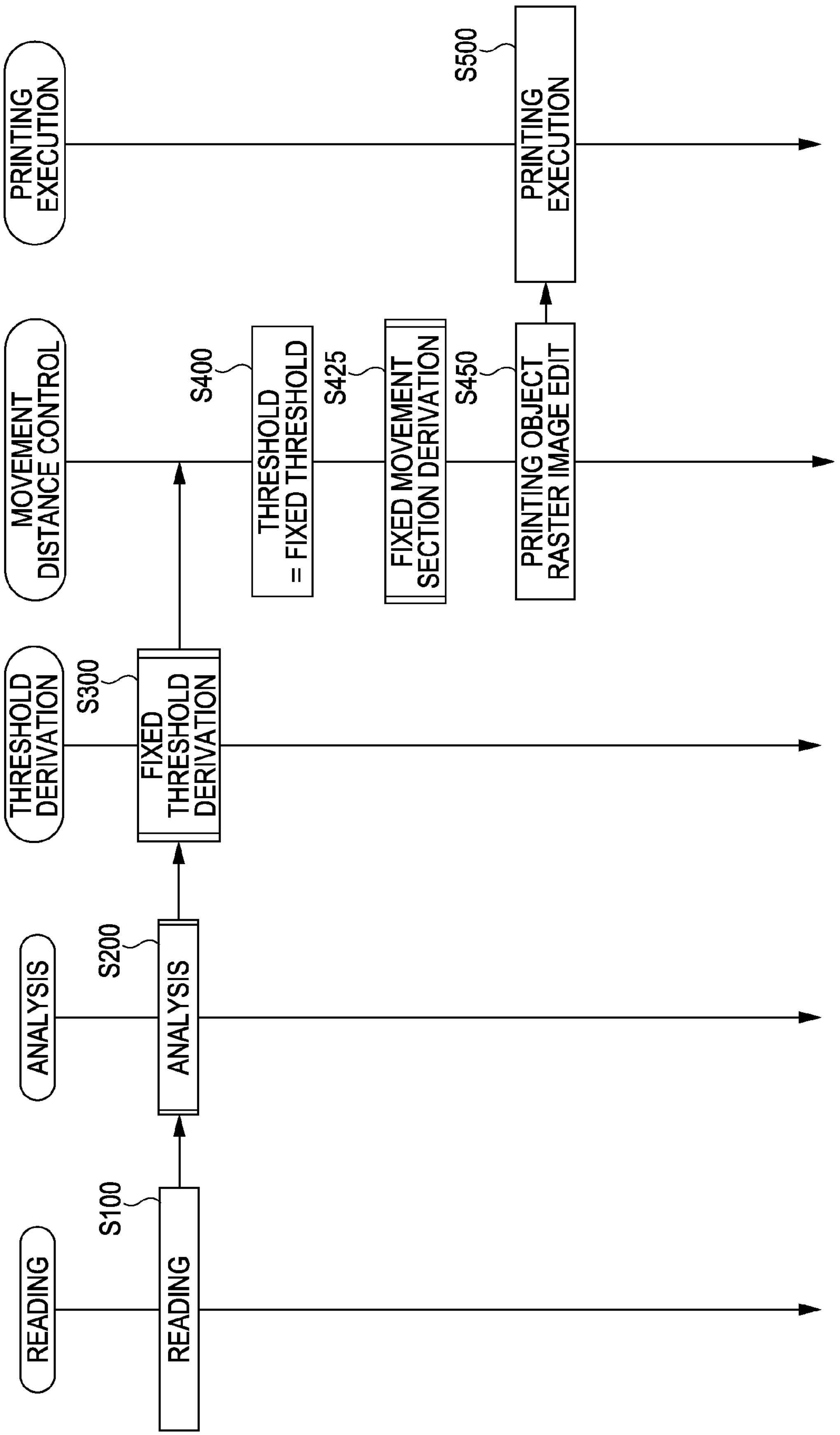
FIG. 4 is a sequence chart according to the embodiment of the invention.

FIG. 4 is a sequence chart showing a printing control method of the digital multifunction machine 1.

First, the scan raster image D1 is read from the manuscript medium 98 (S100). The details are as follows. A signal indicating the intensity of the reflected light of the manuscript medium 98 is output from the scanner 20 in each line according to a control signal output from the control unit 10 and is stored in a buffer region of the RAM 11. The signal indicating the intensity of the reflected light of the manuscript medium 98 stored in the buffer region of the RAM 11 is converted into the scan raster image D1 by performing gamma correction in the band unit. The gamma correction is a process of converting a pixel value such that the background color of the manuscript medium 98 becomes lightest concentration (white). The background color of the manuscript medium 98 is determined by analyzing a concentration distribution of a raster image read by prescanning. These reading processes are controlled by the reading module P11.

Figure 5:
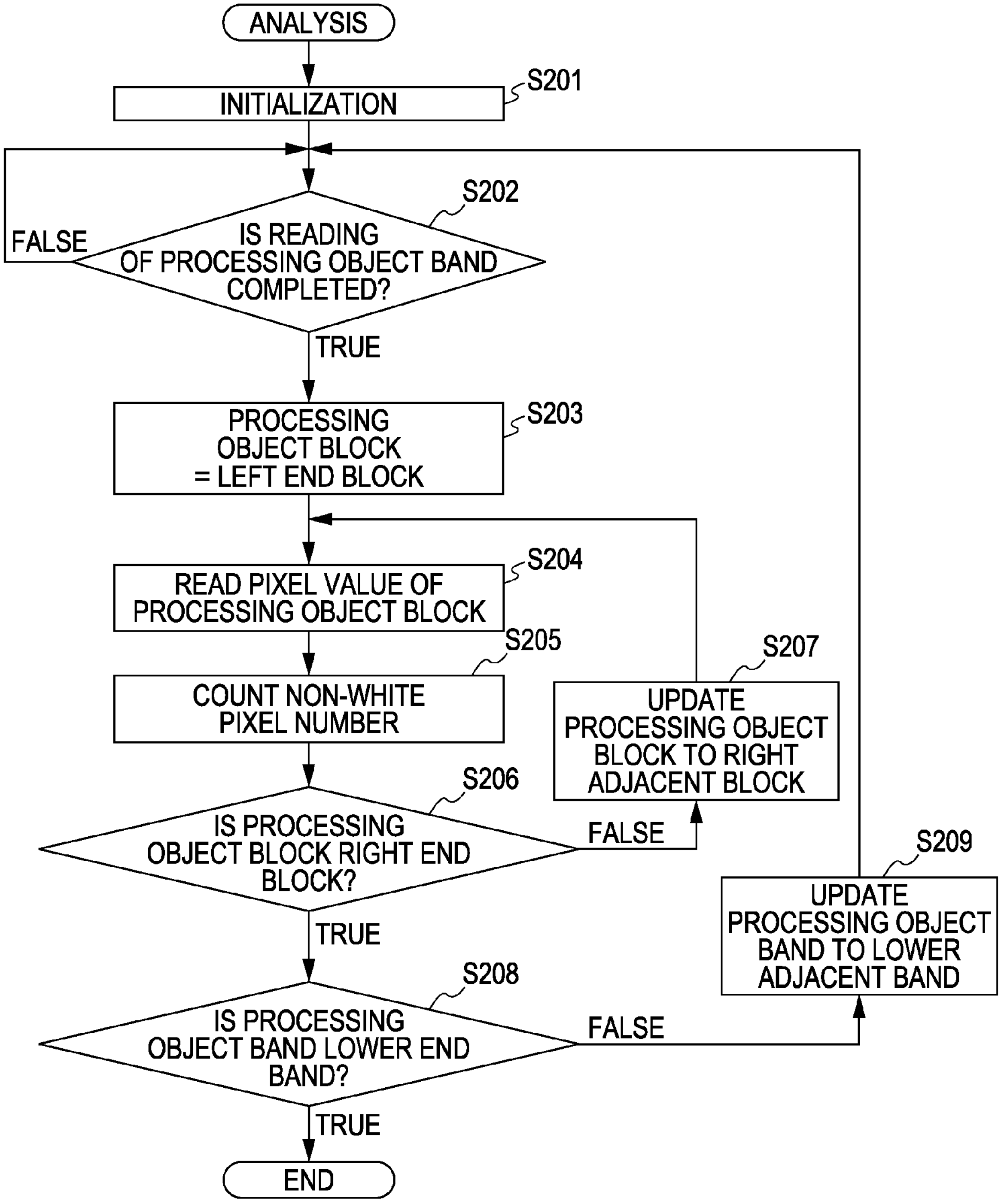
FIG. 5 is a flowchart according to the embodiment of the invention.

Along with the reading process, an analysis process of deriving a horizontal distribution of pixels darker than the background color of the manuscript medium 98 is executed with respect to the scan raster image D1 in each band (S200). FIG. 5 shows the details of the analysis process controlled by the analysis module P12.

In the analysis process, first, initialization of ensuring the region of the RAM 11, setting an upper end band as an initial processing object band or setting an initial value of a variable is performed (S201).

Next, it is determined whether the reading of the processing object band is completed (S202). That is, since the scan raster image D1 is read in each band and the analysis process is executed along with the reading process, it is determined whether the band which is subjected to the analysis process is previously read. If the reading of the processing object band is not completed, the determination is repeated until the processing object band is read. If the reading of the processing object band is completed, the following process is executed with respect to the processing object band.

First, the left end block of the processing object band is set as a processing object block (S203).

Next, the pixel value of the processing object block is read to a predetermined data structure (S204).

Next, the number of pixels, which do not have the lightest concentration (white), of the pixels included in the processing object block is counted (S205). That is, the number of pixels having a luminance less than a maximum value of the pixels included in the processing object block is counted. The number of pixels counted is stored as the non-white pixel horizontal distribution $D_{mn}$ which is the data structure indicating the horizontal distribution of the pixels which do not have the lightest concentration (white). The value of a counter for managing the processing object band corresponds to n and the value of a counter for managing a processing object block corresponds to m.

Next, it is determined whether the processing object block is a right end block (S206). If the processing object block is not the right end block, the current processing object block is updated to a right adjacent block of the processing object block (S207) and then the above-described process from step S204 is repeated. The number of pixels which do not have the lightest concentration (white) is counted in the process of step S205 with respect to all the blocks belonging to the processing object block, and, when the number of pixels which do not have the lightest concentration (white) is counted with respect to all the blocks belonging to the processing object band, the horizontal distribution of the pixels darker than the background color of the manuscript medium 98 is derived with respect to a current processing object band.

If the processing object block is the right end block, it is determined whether the processing object band is a lower end band (S208). If the processing object band is not the lower end band, the processing object band is updated to a lower adjacent band of a current processing object band (S209) and then the above-described process from step S202 is repeated. If the processing object band becomes the lower end band, the analysis process is completed. That is, the above-described analysis process is repeated until the processing object band becomes the lower end block. As a result, the horizontal distribution of the pixels darker than the background color of the manuscript medium 98 is derived with respect to all the bands of the scan raster image D1.

Figure 6:
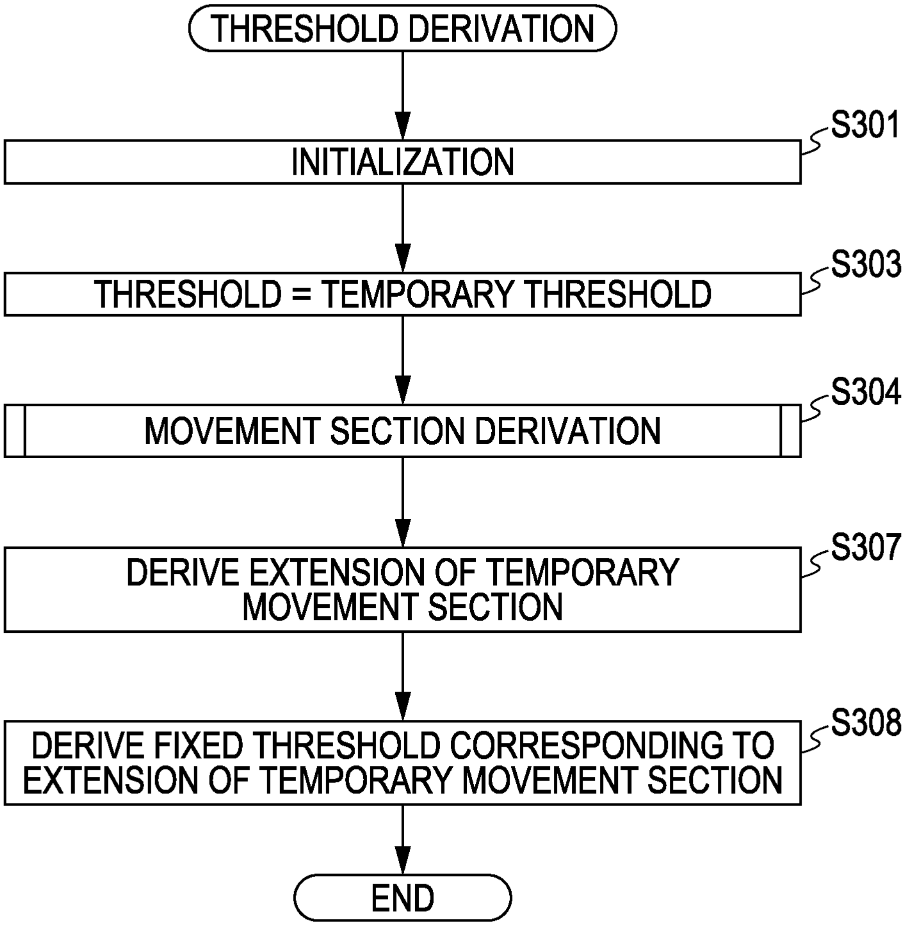
FIG. 6 is a flowchart according to the embodiment of the invention.

Along with the analysis process, a threshold derivation process is executed (S300). FIG. 6 shows the details of the threshold derivation process controlled by the threshold derivation module P13.

In the threshold value derivation process, first, initialization of ensuring the region of the RAM 11 or setting an initial value of a variable is performed (S301).

Next, a threshold for deriving the temporary movement section based on the non-white pixel horizontal distribution $D_{mn}$ is set to the predetermined temporary threshold (S303). Here, the movement section refers to a section in which the printer carriage 35 moves while ejecting the ink from the nozzle group 36 when the nozzle group 36 ejects the ink while moving the printer carriage 35 such that an image having a constant width (the vertical length is constant) is formed on the stopped printing medium 99. That is, the movement section refers to a section in which the nozzle group 36 is moved by logical seeking. In the present embodiment, the temporary threshold is previously determined as a threshold for determining whether characters are mainly written on the manuscript medium 98 or whether photos or figures are mainly written on the manuscript medium 98. Statistically, if characters are mainly written on the manuscript medium 98, a margin is relatively wide and, if photos or figures are mainly written on the manuscript medium 98, a margin is relatively narrow, because a region other than the edge of the manuscript medium 98 is colored. In addition, since the width of the margin of the manuscript medium 98 depends on the size of the manuscript medium 98, it is preferable that the temporary threshold is previously determined according to the size of the manuscript medium 98.

Figure 7:
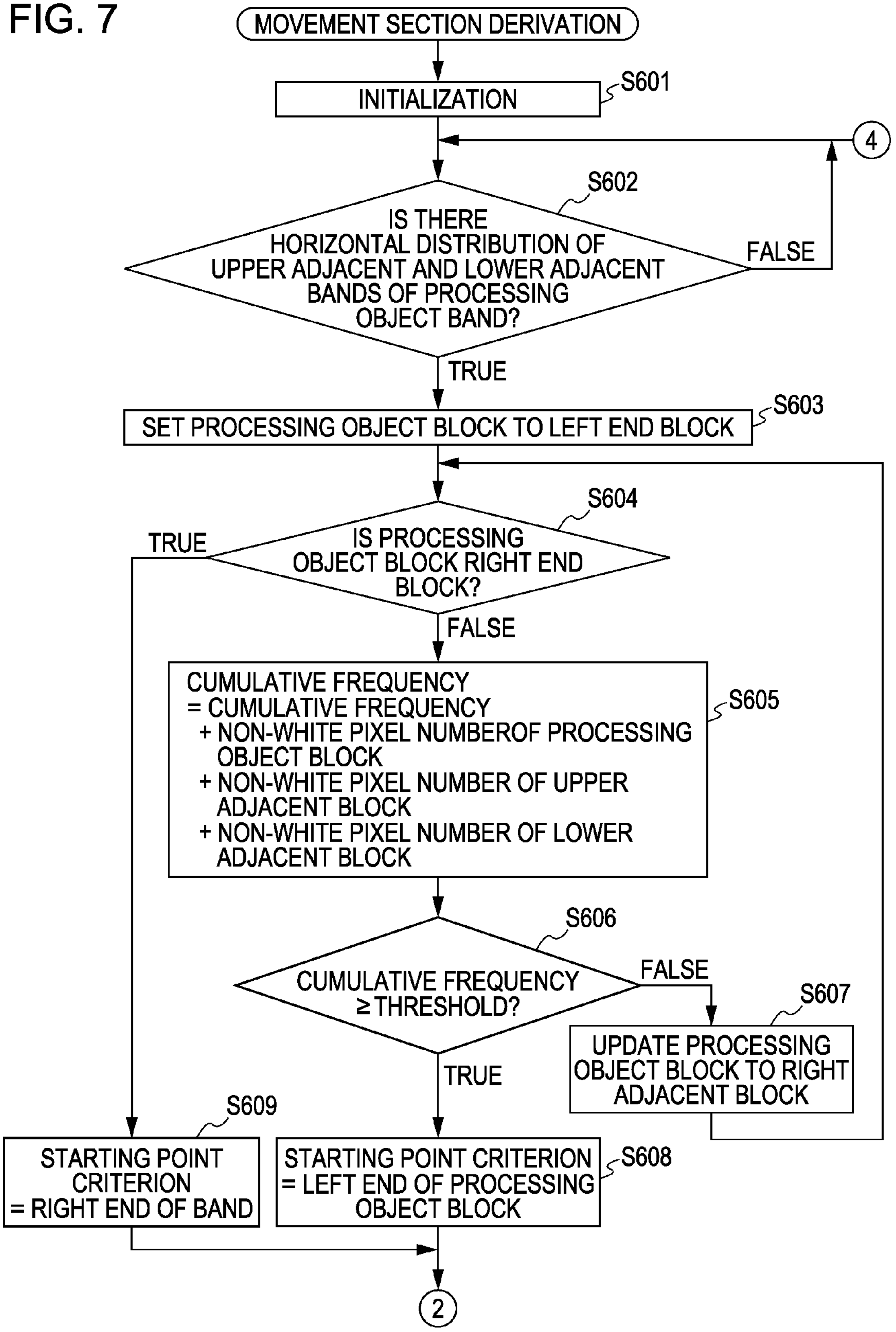
FIG. 7 is a flowchart according to the embodiment of the invention.
Figure 8:
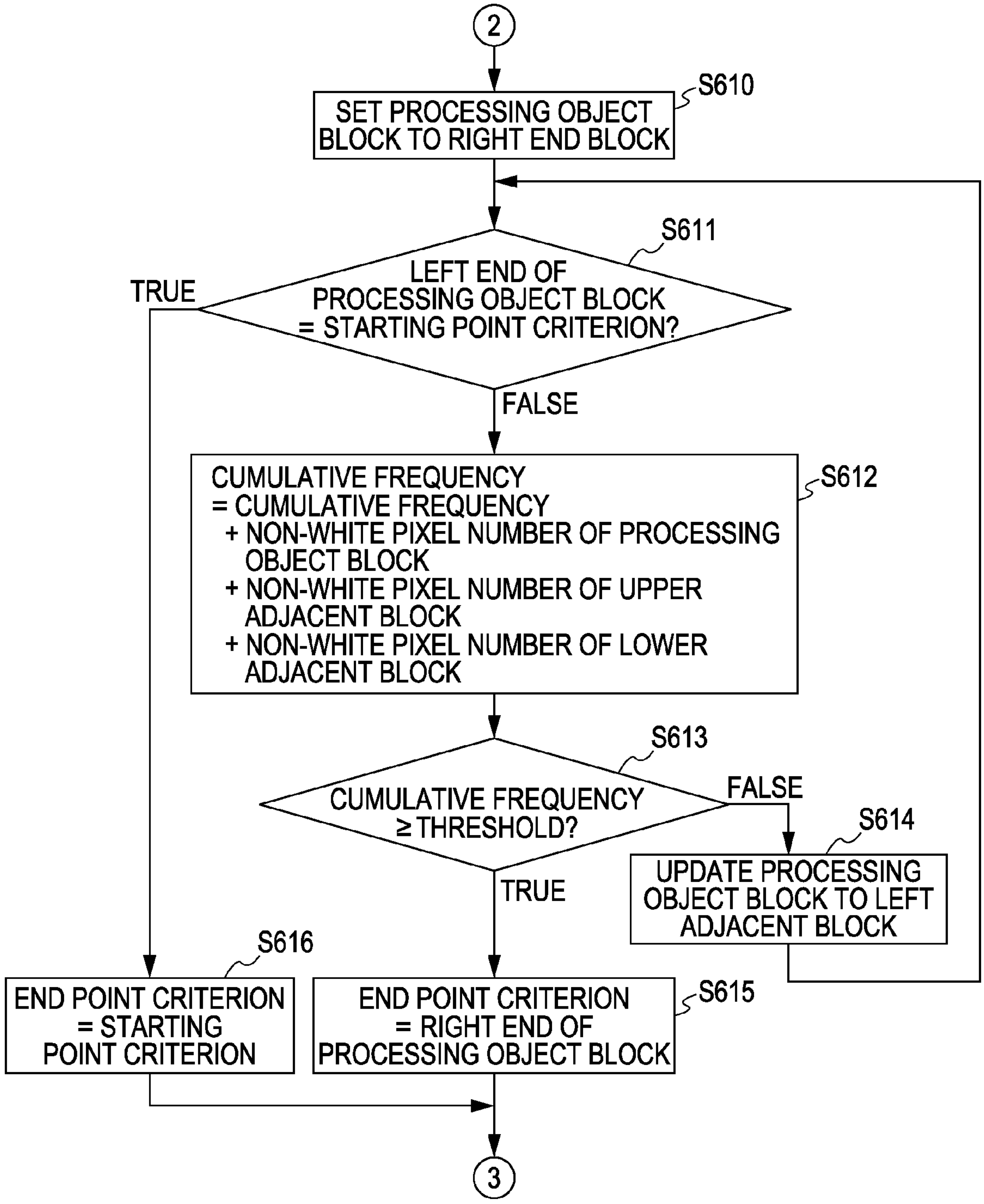
FIG. 8 is a flowchart according to the embodiment of the invention.
Figure 9:
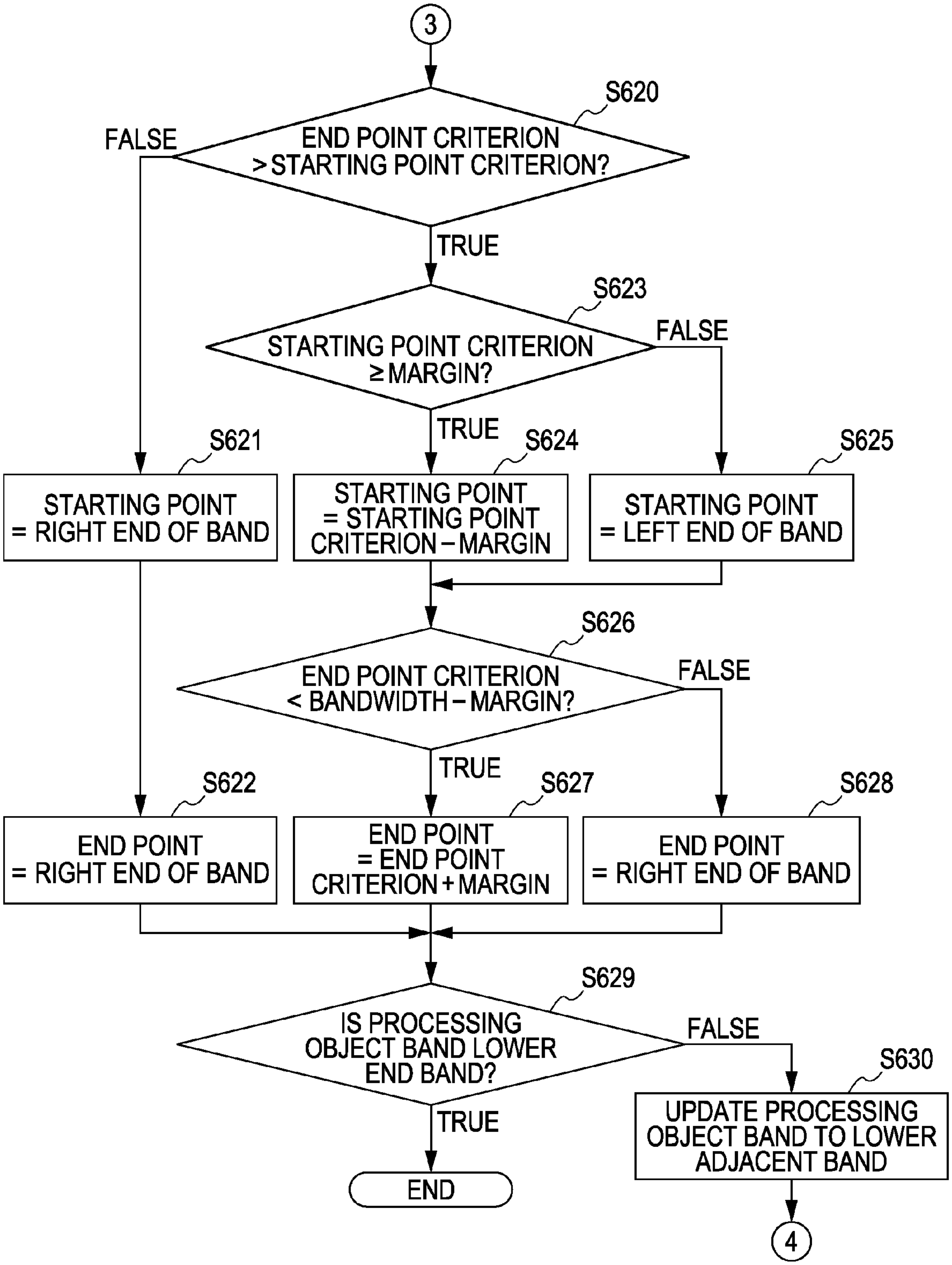
FIG. 9 is a flowchart according to the embodiment of the invention.

Next, a movement section derivation process of deriving a temporary movement section is executed (S304). FIGS. 7, 8 and 9 are flowcharts illustrating the details of the movement section derivation process.

In the movement section derivation process, first, initialization of ensuring the region of the RAM 11, setting an initial value of a variable or setting an upper end band as an initial processing object band is performed (S601).

Next, it is determined whether the non-white pixel horizontal distributions of upper adjacent and lower adjacent bands of the processing object band are derived (S602). In detail, if the processing object band is $B_k$, it is determined whether the non-white pixel horizontal distribution $D_{m(k-1)}$ and the non-white pixel horizontal distribution $D_{m(k+1)}$ are empty. If the horizontal distributions of the upper adjacent and lower adjacent bands of the processing object band are not derived, the determination is repeated until the horizontal distributions of the upper adjacent and lower adjacent bands of the processing object band are derived.

If the horizontal distributions of the upper adjacent and lower adjacent bands of the processing object band are derived, the left end block of the processing object band is set as the processing object block (S603).

Next, it is determined whether the processing object block is the right end block (S604).

If the processing object block is not the right end block, the cumulative frequency of the horizontal distribution is updated by adding the number of non-white pixels included in the processing object block, the number of non-white pixels included in the upper adjacent block of the processing object block and the number of non-white pixels included in the lower adjacent block of the processing object block to the cumulative frequency of the current horizontal distribution (S605). In detail, the value of the non-white pixel horizontal distribution $b_{mk}$ corresponding to the processing object block, the value of the non-white pixel horizontal distribution $b_{m(k-1)}$ corresponding to the upper adjacent block of the processing object block and the value of the non-white pixel horizontal distribution $b_{m(k+1)}$ corresponding to the lower adjacent block of the processing object block are added to the value of the variable as the cumulative frequency from the left end of the horizontal distribution and the result is substituted with the variable as the cumulative frequency from the left end of the horizontal distribution. That is, since the number of non-white pixels belonging to three blocks which are consecutive in the vertical direction is cumulated as the cumulative frequency from the left end of the horizontal distribution, the cumulative frequency from the left end of the horizontal distribution is substantially derived in each band by setting three bands as one band. Therefore, a non-margin section may be set so as to include a pixel corresponding to a portion slightly projecting to one block of a line written across the border of two blocks adjacent in the vertical direction or a pixel corresponding to a point element of a character (for example, "i" of alphabet shown in FIG. 7A) which is written cross the border and has the point element written in one block.

Next, it is determined whether the cumulative frequency from the left end of the horizontal distribution is equal to or greater than the threshold (S606). The threshold used in the temporary movement section derivation process is the temporary threshold set in the step S303. That is, if the processing object band is $B_k$, it is determined whether the sum of the cumulative frequency from the left end of the non-white pixel horizontal distribution $b_{mk}$, the cumulative frequency from the left end of the non-white pixel horizontal distribution $b_{m(k-1)}$, and the cumulative frequency from the left end of the non-white pixel horizontal distribution $b_{m(k+1)}$ is equal to or greater than the temporary threshold.

If the cumulative frequency from the left end of the horizontal distribution is less than the threshold, the processing object blocks is updated to the right adjacent block of the current processing object block (S607) and then the above-described process from step S604 is repeated.

If the cumulative frequency from the left end of the horizontal distribution is equal to or greater than the threshold, the x coordinate of the left end of the processing object block is set as the starting point criterion (S608). In the movement section derivation process for deriving the temporary movement section, the x coordinate of the left end of the processing object block is set as the temporary starting point criterion which is the left end of the temporary non-margin section. Here, the temporary movement section D8 is defined as the data structure in which the temporary starting point and the temporary end point of the temporary movement section are maintained.

If the cumulative frequency from the left end of the horizontal distribution does not become equal to or greater than the threshold until the processing object block becomes the right end block (if true in S604), the x coordinate of the right end of the processing object block is set as the starting point criterion (S609). That is, since the processing object block is the right end block, the x coordinate of the right end of the band is set as the starting point criterion. In the movement section derivation process of deriving the temporary movement section, the x coordinate of the right end of the band is set as the temporary starting point criterion.

When the starting point criterion is set, the processing object block is then set to the right end block (S610).

Next, it is determined whether the x coordinate of the left end of the processing object block is equal to the starting point criterion (S611).

If the x coordinate of the left end of the processing object block is not equal to the starting point criterion, the cumulative frequency of the horizontal distribution is updated to the number obtained by adding the number of non-white pixels included in the processing object block to the cumulative frequency of the current horizontal distribution (S612). In detail, the value of the non-white pixel horizontal distribution $b_{mk}$ corresponding to the processing object block, the value of the non-white pixel horizontal distribution $b_{m(k-1)}$ corresponding to the upper adjacent block of the processing object block and the value of the non-white pixel horizontal distribution $b_{m(k+1)}$ corresponding to the lower adjacent block of the processing object block are added to the value of the variable as the cumulative frequency from the right end of the horizontal distribution, and the result is substituted with the variable as the cumulative frequency from the right end of the horizontal distribution. That is, since the number of non-white pixels belonging to three blocks which are consecutive in the vertical direction is cumulated as the cumulative frequency from the right end of the horizontal distribution, the cumulative frequency from the right end of the horizontal distribution is substantially derived in each band by setting three bands as one band.

Next, it is determined whether the cumulative frequency from the right end of the horizontal distribution is equal to or greater than the threshold (S613). The threshold used in the movement section derivation process for deriving the temporary movement section is the temporary threshold set in the step S303. That is, here, it is determined whether the cumulative frequency from the right end of the horizontal distribution is equal to or greater than the temporary threshold.

If the cumulative frequency from the right end of the horizontal distribution is less than the threshold, the processing object blocks is updated to the right adjacent block of the current processing object block (S614) and then the above-described process from step S611 is repeated.

If the cumulative frequency from the right end of the horizontal distribution is equal to or greater than the threshold, the x coordinate of the right end of the processing object block is set as the end point criterion (S608). In the movement section derivation process for deriving the temporary movement section, the x coordinate of the right end of the processing object block is set as the temporary end point criterion which is the right end of the temporary non-margin section.

If the cumulative frequency from the right end of the horizontal distribution does not become equal to or greater than the threshold until the x coordinate of the left end of the processing object block is equal to the starting point criterion (if true in S611), the x coordinate is set as the end point criterion similar to the starting point criterion (S616). That is, the starting point criterion and the end point criterion become the x coordinate of the right end of the band and the length of the non-margin section becomes 0.

If the end point criterion is set, then it is determined whether the end point criterion is greater than the starting point criterion (S620). That is, it is determined whether the end point criterion is located on the right side of the starting point criterion.

If the end point criterion is greater than the starting point criterion, it is determined whether the starting point criterion is greater than a predetermined margin (S623).

If the starting point criterion is greater than the predetermined margin, a value obtained by subtracting the margin from the starting point criterion is set as the starting point of the movement section (S624). That is, the starting point of the movement section is set to the left from the starting point criterion by the width of the margin. In the movement section derivation process for deriving the temporary movement section, the value obtained by subtracting the margin from the temporary starting point criterion is set as the starting point of the temporary movement section. By setting the value obtained by subtracting the margin from the temporary starting point criterion as the starting point of the temporary movement section, the movement section is prevented from being set with respect to a margin wider than an actual margin of the manuscript medium 98 as adverse effect of the analysis of the horizontal distribution in the block unit.

If the starting point criterion is not greater than the predetermined margin, the x coordinate of the left end of the band is set as the starting point of the movement section (S625). In the movement section derivation process of deriving the temporary movement section, the x coordinate of the left end of the band is set as the starting point of the temporary movement section.

Next, it is determined whether the end point criterion is less than the value obtained by subtracting the predetermined margin from a bandwidth (S626).

If the end point criterion is less than the value obtained by subtracting the predetermined margin from the bandwidth, the value obtained by adding the margin to the end point criterion is set as the end point of the movement section (S627). That is, the starting point of the movement section is set to the right from the end point criterion by the width of the margin. In the movement section derivation process for deriving the temporary movement section, the value obtained by adding the margin to the temporary end criterion is set as the end point of the temporary movement section.

If the end point criterion is not less than the value obtained by subtracting the predetermined margin from the bandwidth, the x coordinate of the right end of the band is set as the end point of the movement section. In the movement section derivation process of deriving the temporary movement section, the x coordinate of the right end of the band is set as the end point of the temporary movement section.

Meanwhile, if the end point is not greater than the starting point criterion (if false in S620), the x coordinate of the right end of the band is set to the starting point and the end point of the movement section (S621 and 622). That is, the x coordinate of the right end of the band is set to the end point criterion and the starting point criterion, the starting point and the end point of the movement section become the x coordinate of the right end of the band and the length of the movement section becomes 0.

If the starting point and the end point of the movement section are set with respect to the processing object and, then it is determined whether the processing object band is the lower end band (S629). If the processing object band is not the lower end band, the processing object band is updated to the lower adjacent band of the current processing object band (S630) and then the above-described process from step S602 is repeated. If the processing object band becomes the lower end band, the movement section derivation process is completed. That is, the above-described movement section derivation process is repeated until the processing object block becomes the lower end band and, as a result, the starting point and the end point of the movement section are set with respect to all the bands of the scan raster image D1.

If the movement section derivation process of deriving the temporary movement section is completed, then the extension of the temporary movement section is derived (S307). In detail, the total sum of the value obtained by subtracting the starting point from the end point of the temporary movement section in each band is derived as the extension of the temporary movement section.

Next, a fixed threshold corresponding to the extension of the temporary movement section is derived (S308). In detail, if the extension of the temporary movement section is relatively large, a relatively large fixed threshold is derived. That is, if the margin of the manuscript medium 98 is relatively wide, the fixed threshold is derived to become relatively large. For example, the extension of the temporary movement section may be compared with one or more predetermined thresholds, any one is selected from a plurality of predetermined values according to the magnitude relationship between the threshold and the derived extension, and the selected value may be set to the fixed threshold. For example, a function of the extension of the temporary movement section and the fixed threshold may be defined in advance.

If the threshold derivation process is completed, a movement distance control process is subsequently executed. The movement distance control process is controlled by the movement distance control module P14.

In the movement distance control process, first, the threshold for driving the fixed movement section based on the non-white pixel horizontal distribution $D_{mn}$ is set to the fixed threshold derived in the threshold derivation process (S400). Here, a fixed movement section D9 is defined as the data structure for maintaining the fixed starting point and the fixed end point of the fixed movement section.

Next, the above-described movement section derivation process is executed using the threshold set as the fixed threshold in order to derive the fixed movement section (S425). As a result, the fixed starting point criterion and the fixed end point criterion of the fixed non-margin section and the fixed starting point and the fixed end point of the fixed movement section are sequentially set.

Figure 10A:
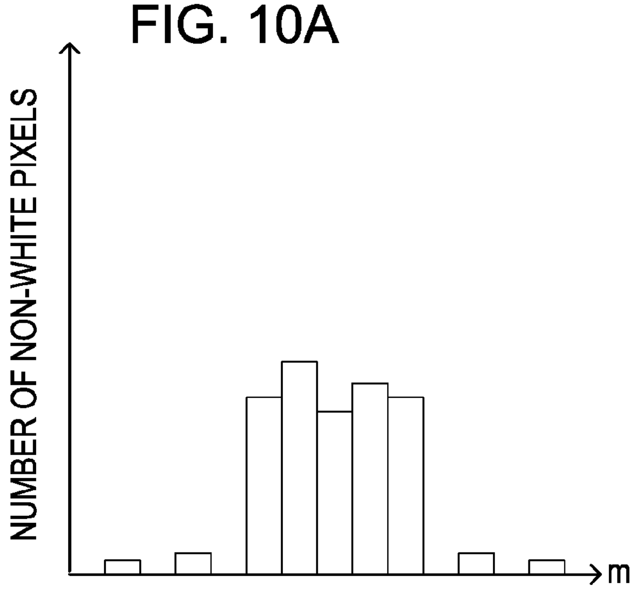
FIG. 10A is a histogram according to the embodiment of the invention and FIG. 10B is a bar graph according to the embodiment of the invention.
Figure 10B:
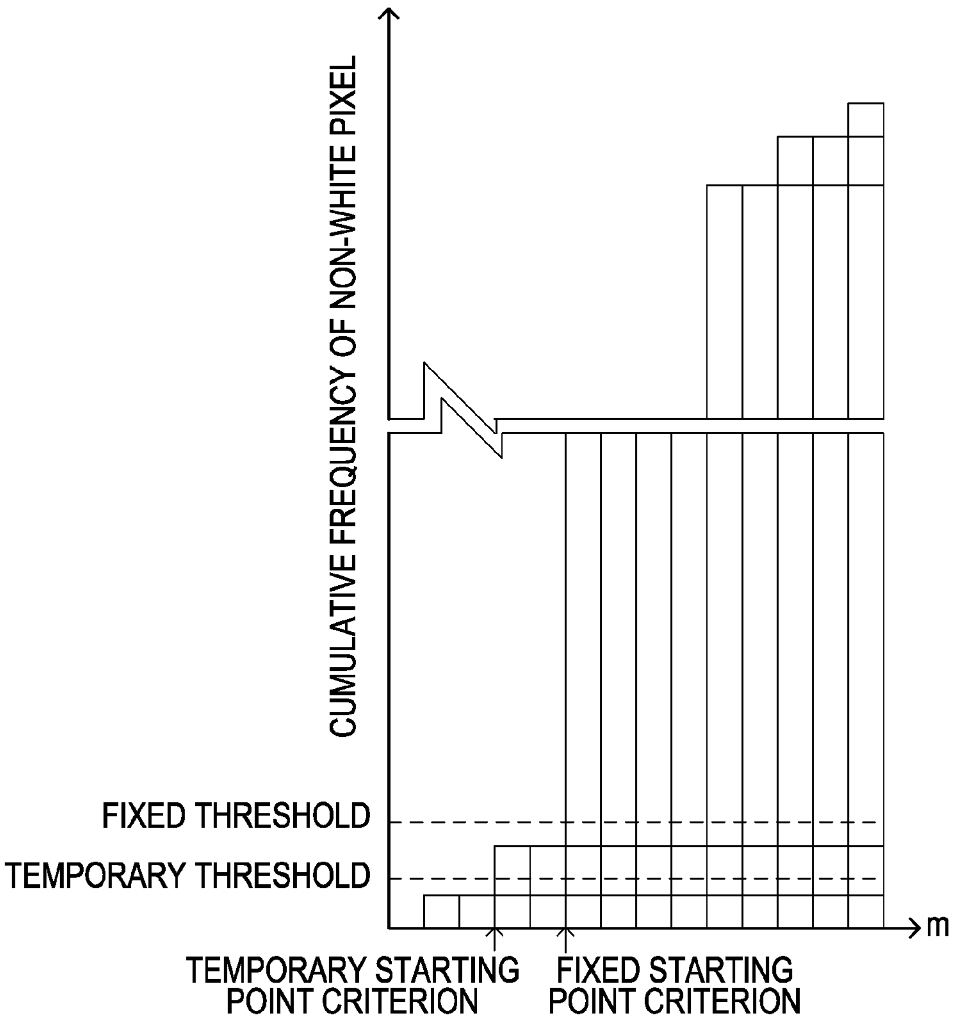

Now, the relationship among the temporary threshold, the fixed threshold, the temporary non-margin section, the temporary movement section, the fixed non-margin section and the fixed movement section will be described with reference to FIG. 10. FIG. 10A is a histogram showing the horizontal distribution of the pixels darker than the background color of the manuscript medium 98 with respect to a specific band $B_k$. The grade value of a horizontal axis of FIGS. 10A and 10B is a suffix m of the non-white pixel horizontal distribution $b_{mk}$ corresponding to the block b belonging to the band $B_k$. The frequency of the vertical axis of FIG. 10A is the number of non-white pixels included in a certain block b belonging to the specific band $B_k$, that is, the value of the non-white pixel horizontal distribution $b_{mk}$. FIG. 10B shows the cumulative value from the left end of the horizontal distribution of the specific band $B_k$, that is, the cumulative value from the left end of the non-white pixel horizontal distribution $b_{mk}$.

If the fixed threshold greater than the temporary threshold is set as shown in FIG. 10B, the fixed starting point criterion which is the left end of the fixed non-margin section is set at the right side of the temporary starting point criterion which is the left end of the temporary non-margin section. That is, if the section from the left end of the band to the starting point criterion is a left margin section, the fixed left margin section becomes longer than the temporary left margin section. In addition, the temporary starting point which is the left end of the temporary movement section and the fixed starting point which is the left end of the fixed movement section are set to be close to the left rather than the temporary starting point criterion and the fixed starting point criterion by the width of the margin, respectively. That is, the fixed movement section is derived according to the temporary left margin section.

If the fixed threshold greater than the temporary threshold is set, similarly, the fixed end point criterion which is the right end of the fixed non-margin section is set at the left side of the temporary end point criterion which is the right end of the temporary non-margin section. That is, if the section from the right end of the band to the end point criterion is a right margin section, the fixed right margin section becomes longer than the temporary right margin section. The temporary end point which is the right end of the temporary movement section and the fixed end point which is the right end of the fixed movement section are set to be close to the right rather than the temporary end point criterion and the fixed end point criterion by the width of the margin, respectively. That is, the fixed movement section is derived according to the temporary right margin section.

Figure 11:
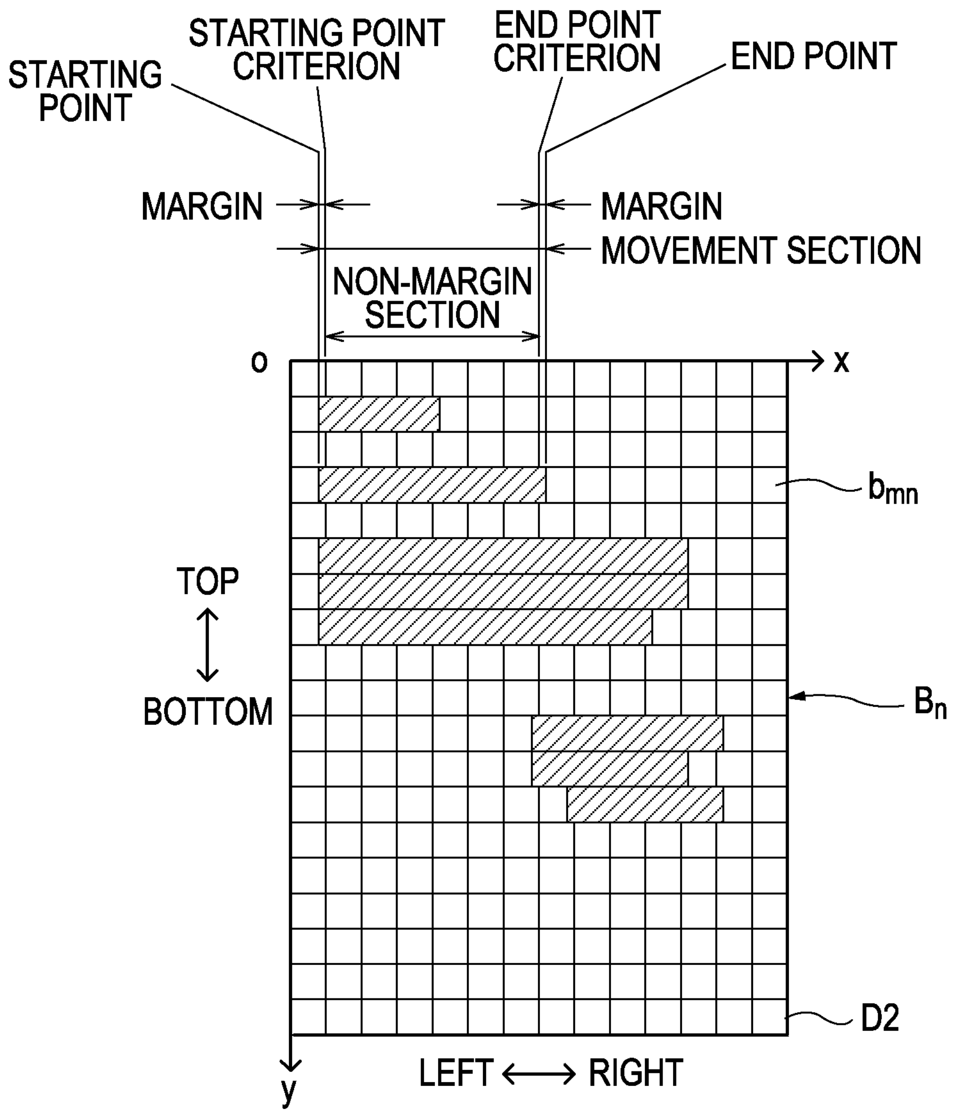
FIG. 11 is a schematic diagram illustrating a printing object raster image according to the embodiment of the invention.

If the movement section derivation process for deriving the fixed movement section is completed, the printing object raster image D2 is subsequently edited from the scan raster image D1 based on the fixed movement section (S450). In detail, the pixel values of all the pixels located at the outside of the fixed movement section in each band are replaced with the lightest concentration (white). That is, all noise pixels which are located at the outside of the movement section in the scan raster image D1 and do not have the lightest concentration are replaced with the pixel having the lightest concentration so as to disappear. FIG. 11 is a schematic view showing the printing object raster image D2. In FIG. 11, a block in which all the pixel values the lightest concentration (white) is shown in a square shape and the fixed movement section of each band is hatched.

Along with the editing of the printing object raster image D2, a printing execution process is executed (S500). The printing execution process is controlled by the printing execution module P15. Since the printing object raster image D2 is edited in the band unit, the printing execution process is executed by logical seeking in the band unit. In detail, by performing plate division using a color conversion table (for example, conversion from a RGB color space into a CMYK color space), half-toning (for example, binarization using an error diffusion method), rearrangement of data in ink ejection order, the printing object raster image D2 is converted into printing control data D3. In addition, the printing control data D3 are transmitted to the nozzle driving unit 42 and the printer carriage driving unit 41 as a control signal in the unit corresponding to the height of the nozzle group 36 (the length of the printing medium in the transportation direction). Whenever the printing control data D3 are transmitted to the nozzle driving unit 42 and the printer carriage driving unit 41 in the unit corresponding to the height of the nozzle group 36, the image having the height of the nozzle group 36 is formed on the printing medium 99 within the movement section derived in the movement distance restricting process. Whenever the image having the height of the nozzle group 36 is formed on the printing medium 99 within the movement section, the control signal is transmitted to the roller driving unit 40 and the printing medium 99 moves forward by the height of the nozzle group 36.

When the printing execution process is executed, all the pixel values of the pixels located at the outside of the movement section in the printing object raster image D2 have the lightest concentration (white), the nozzle group 36 does not need to move to the outside of the movement section. Accordingly, since the distance by which the nozzle group 36 moves can be reduced in logical seeking, it is possible to reduce the movement distance of the printer carriage 35. Therefore, a time required for copy is reduced.

According to the embodiment of the invention which is described up to now, since the unnecessary movement of the printing head can be reduced according to the kind of the manuscript as compared with the case where the threshold value for deriving the fixed movement section is fixed to one predetermined value, it is possible to further reduce the time required for copy. In addition, since the fixed threshold is derived to be increased as the margin of the manuscript medium 98 is increased, it is possible to suppress a problem in which an object, which is not originally processed as noise, is not displayed as the printing result.

3. Other Embodiments

In addition, the technical range of the invention is not limited to the above-described embodiment and may be variously modified without departing from the scope of the invention.

For example, the invention is applicable to an Auto Document Feeder (ADF) mount type digital multifunction machine. In this case, the copy process shown in FIG. 4 is repeatedly executed in units of one page. If the invention is applied to the ADF mount type digital multifunction machine, the non-white pixel horizontal distribution based on the derivation of the fixed threshold may be corrected.

For example, in order to derive the fixed threshold to be increased as the margin of the manuscript medium is increased, instead of the process of step S307, the number of temporary movement sections having a length of a predetermined threshold or less may be derived and, instead of the process of step S308, the fixed threshold corresponding to the derived number may be derived. For example, the number of temporary movement sections having a length of a first predetermined threshold or less may be compared with one or more second predetermined thresholds, any one is selected from a plurality of predetermined values according to the magnitude relationship between the derived number and the second threshold, and the selected value may be set to the fixed threshold. For example, a function of the number of temporary movement sections having the length of the first predetermined threshold or less and the fixed threshold may be defined in advance.

For example, although the horizontal distribution of all the bands corresponding to one page of the manuscript medium 98 is used for deriving the fixed threshold in the above-described embodiment, the horizontal distribution corresponding to bands corresponding to the front range in one page of the manuscript medium 98 may be used for deriving the fixed threshold. In detail, instead of the process of step S629 of the temporary movement section derivation process, it may be determined whether the processing object band is a band located in the vicinity of the center of one page and the processes of steps S629 and S630 may be removed and the fixed threshold may be derived based on only the horizontal distribution of three bands of the upper end.

For example, although the movement distance of the printing head is reduced according to the section in which the cumulative frequency of the horizontal distribution of the edge of the band exceeds the fixed threshold in the entire printing range in the above-described embodiment, the following modification may be made. That is, the movement distance of the printing head may be reduced according to the section in which the cumulative frequency of the horizontal distribution from the edge of the band of the front side of the printing range corresponding to the band used for deriving the fixed threshold exceeds the temporary threshold and the movement distance of the printing head may be reduced according to the section in which the cumulative frequency of the horizontal distribution from the edge of the band in the rear side of the printing range which does not correspond to the band used for deriving the fixed threshold exceeds the fixed threshold.

Figure 12:
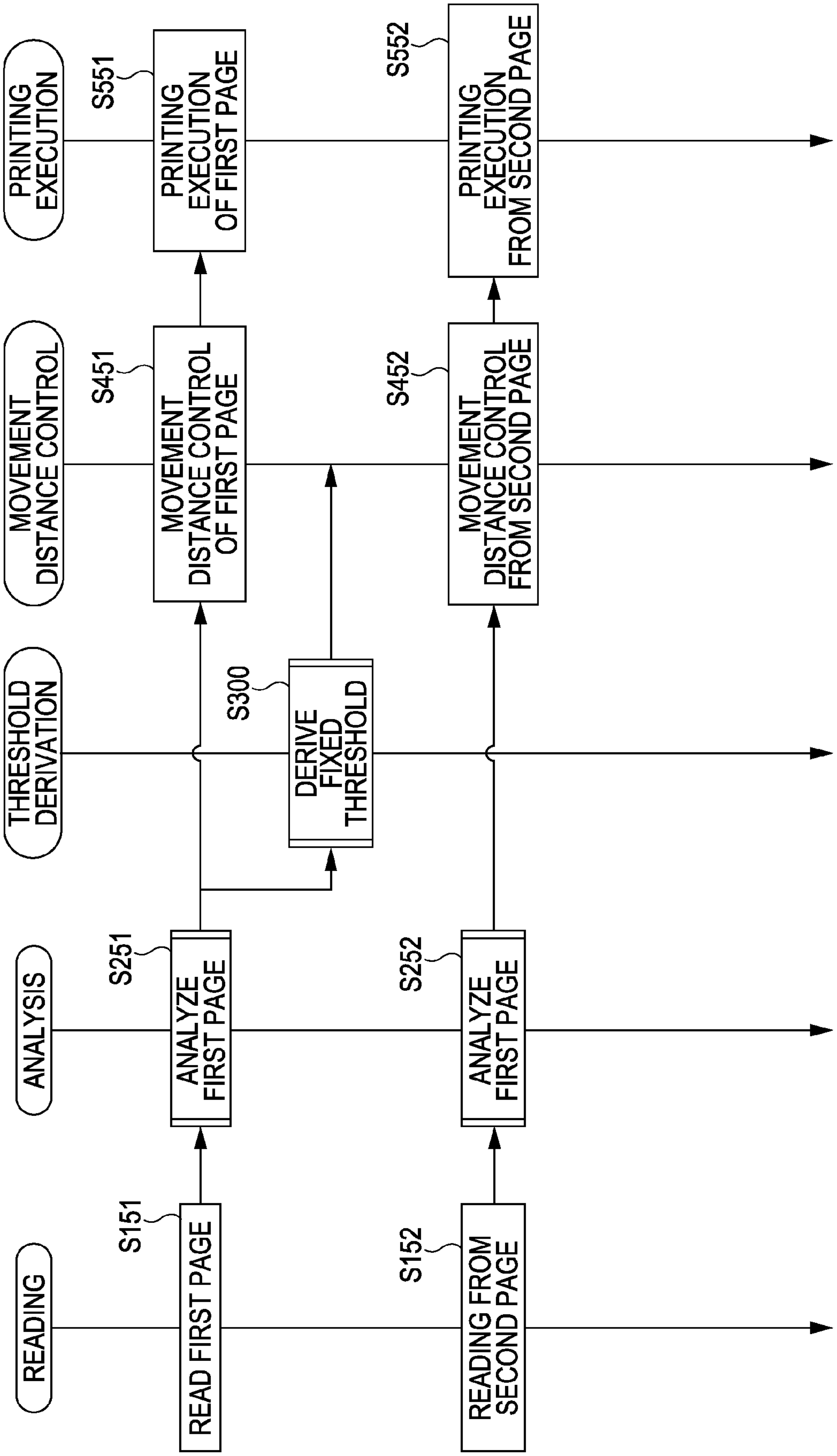
FIG. 12 is a sequence chart according to another embodiment of the invention.

FIG. 12 is a sequence chart showing the flow of a process when such a modification is applied to an ADF mount type digital multifunction machine.

First, the scan raster image D1 is read from a first page of the manuscript medium 98 (S151).

In parallel with the reading of the scan raster image D1 from the first page of the manuscript medium 98, the horizontal distribution of the pixels darker than the background color of the manuscript medium 98 is derived with respect to the scan raster image D1 of the first page in each band (S251). This process is equal to the analysis process of step S200.

In parallel with the derivation of the horizontal distribution of the pixels darker than the background of the manuscript medium 98 in each band with respect to the scan raster image D1 of the first page, the movement distance control process is executed with respect to the first page (S451). As a result, the printing object raster image D2 of the first page is edited. At this time, a predetermined temporary threshold is used as the threshold for deriving the fixed movement section.

In parallel with the execution of the movement distance restricting process with respect to the first page, the printing execution process is executed with respect to the first page (S551).

In parallel with the derivation of the horizontal distribution of the pixels darker than the background of the manuscript medium 98 in each band with respect to the scan raster image D1 of the first page, the threshold derivation process is executed based on the horizontal distribution of the pixels darker than the background of the manuscript medium 98 in the scan raster image D1 of the first page and the fixed threshold is derived (S300).

If the scan raster image D1 is read from the first page of the manuscript medium 98, the scan raster image D1 is sequentially read from a second page and the subsequent pages of the manuscript medium 98 (S152).

In parallel with the sequential reading of the scan raster image D1 from the second page and the subsequent pages of the manuscript medium 98, the horizontal distribution of the pixels darker than the background of the manuscript medium 98 is sequentially derived in each band with respect to the scan raster image D1 from the second page and the subsequent pages (S252). This process is the process of repeating the analysis process of step S200 in the page unit.

In parallel with the sequential derivation of the horizontal distribution of the pixels darker than the background of the manuscript medium 98 in each band with respect to the scan raster image D1 of the second page and the subsequent pages, the movement distance control process is executed with respect to the second page and the subsequent pages (S452). As a result, the printing object raster image D2 of the second page and the subsequent pages is edited. At this time, the fixed threshold derived in step S300 is used as the threshold for deriving the fixed movement section.

In parallel with the movement distance restricting process of the second page and the subsequent pages, the printing execution process is executed with respect to the second page and the subsequent pages (S552).

In the ADF mount type digital multifunction machine, the movement distance restricting process of the first page is executed using the temporary threshold and the movement distance restricting process of the second page and the subsequent pages is executed using the fixed threshold derived based on the horizontal distribution of the first page of the pixel darker than the background of the manuscript medium 98 such that the time required for copy of the manuscript medium 98 composed of a plurality of pages can be shortened.

Similarly, the movement distance restricting process may be executed using the temporary threshold with respect to one or more bands located at the upper side of the page and the movement distance restricting process of the rest located at the lower side of the page may be executed using the fixed threshold derived based on the horizontal distribution of the band of the upper side of the page of the pixel darker than the background of the manuscript medium 98. This process may be repeated in the page unit.

For example, the number of temporary thresholds may be plural. The temporary movement section extension derived in each temporary threshold and the predetermined separate threshold in each temporary threshold may be compared and, if the temporary movement section extension is greater (or less) than the predetermined separate threshold, the printing object raster image D2 may be edited using the temporary movement section as the fixed movement section. That is, in this case, any one of the plurality of predetermined temporary thresholds is derived as the fixed threshold.

For example, the number of non-white pixels belonging to one block may be cumulated as the cumulative frequency of the horizontal distribution. For example, the number a of lines a configuring one band and the vertical length c of one block may be different.

For example, instead of the reduction of the movement distance of the printing head by the editing of the printing object raster image D3, the scan raster image D1 may be directly converted into the printing control data D3 and the control signal may be transmitted to the printer carriage driving unit 41 using directly the fixed movement section.

For example, the scanner 20 configuring the reading unit may be of a reduction optical type. A thermal method may be employed in the nozzles configuring the printing head, and a dot impact type or thermal transfer type printing head other than an ink jet printing head may be employed.

Up to now, the embodiment in which the fixed threshold corresponding to the length of the temporary non-margin section in which the cumulative frequency of the horizontal distribution from the edge of the band is equal to or greater than the predetermined temporary threshold is derived has been described. In addition, the embodiment in which the movement distance of the printing head is reduced according to the fixed non-margin section in which the cumulative frequency of the horizontal distribution from the edge of the band is equal to or greater than the fixed threshold has been described. However, the derivation of the fixed threshold corresponding to the length of the temporary non-margin section in which the cumulative frequency of the horizontal distribution from the edge of the band is greater than the predetermined temporary threshold and the derivation of the fixed threshold according to the length of the temporary margin section in which the cumulative frequency of the horizontal distribution from the edge of the band is less than the predetermined temporary threshold are substantially equal. The reduction of the movement distance of the printing head according to the fixed non-margin section in which the cumulative frequency of the horizontal distribution from the edge of the band is greater than the fixed threshold and the reduction of the movement distance of the printing head according to the fixed margin section in which the cumulative frequency of the horizontal distribution from the edge of the band is less than the fixed threshold are substantially equal.

What is claimed is:

1. A serial printer comprising:

a reading unit configured to read a raster image from a manuscript medium;

an analysis unit configured to derive a horizontal distribution of pixels darker than a background color of the manuscript medium in each band including a predetermined number of lines with respect to the raster image;

a threshold derivation unit configured to derive a fixed threshold according to a length L of a section in which a cumulative frequency of the horizontal distribution from an edge of the band does not exceed a predetermined temporary threshold; and a movement distance control unit configured to reduce a movement distance of a printing head according to a section in which the cumulative frequency of the horizontal distribution from the edge of the band exceeds the fixed threshold.

2. The serial printer according to claim 1, wherein the threshold derivation unit derives the fixed threshold such that the wider the margin of the manuscript medium is, the higher the fixed threshold is.

3. The serial printer according to claim 1, wherein the threshold derivation unit derives the fixed threshold according to extension T of a plurality of lengths L.

4. The serial printer according to claim 1, wherein the threshold derivation unit derives the fixed threshold value according to the number N of a temporary margin section longer than a predetermined threshold L0.

5. The serial printer according to claim 1, wherein the threshold derivation unit derives the fixed threshold based on the horizontal distributions of all the bands corresponding to one page of the manuscript medium.

6. The serial printer according to claim 1, wherein the threshold derivation unit derives the fixed threshold based on the horizontal distribution of the band corresponding to the front range in one page of the manuscript medium.

7. The serial printer according to claim 1, wherein the movement distance control unit reduces the movement distance of the printing head according to the section in which the cumulative frequency of the horizontal distribution from the edge of the band exceeds the temporary threshold in the front side of the printing range corresponding to the band as a basis of deriving the fixed threshold, and reduces the movement distance of the printing head according to the section in which the cumulative frequency of the horizontal distribution from the edge of the band exceeds the fixed threshold in the rear side of the printing range which does not correspond to the band as a basis of deriving the fixed threshold.

8. The serial printer according to claim 1, wherein the movement distance control unit reduces the movement distance of the printing head over the entire printing range according to the section in which the cumulative frequency of the horizontal distribution from the edge of the band exceeds the fixed threshold.

* * * * *